United States Patent
Patankar et al.

(10) Patent No.: US 12,284,094 B2
(45) Date of Patent: Apr. 22, 2025

(54) UTILIZING MACHINE LEARNING MODELS FOR NETWORK TRAFFIC CATEGORIZATION

(71) Applicant: Juniper Networks, Inc., Sunnyvale, CA (US)

(72) Inventors: Ajit Krishna Patankar, Fremont, CA (US); Kaushik Adesh Agrawal, Chelmsford, MA (US); Kihwan Han, Pleasanton, CA (US); Monimoy Deb Purkayastha, Bangalore (IN); Patrick John Melampy, Dunstable, MA (US); Patrick Timmons, Natick, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 182 days.

(21) Appl. No.: 18/147,489

(22) Filed: Dec. 28, 2022

(65) Prior Publication Data

US 2024/0223478 A1 Jul. 4, 2024

(51) Int. Cl.
*H04L 43/04* (2022.01)
*H04L 41/16* (2022.01)
(Continued)

(52) U.S. Cl.
CPC .............. *H04L 43/04* (2013.01); *H04L 41/16* (2013.01); *H04L 43/062* (2013.01);
(Continued)

(58) Field of Classification Search
CPC ....... H04L 43/04; H04L 43/026; H04L 41/16; H04L 43/50; H04L 47/27; H04L 47/283; H04L 47/12; H04L 47/29; H04L 47/22; H04L 47/2441; H04L 43/0882; H04L 41/0896; H04L 47/822; H04L 43/0876;
(Continued)

(56) References Cited

U.S. PATENT DOCUMENTS 8,738,906 B1 * 5/2014 Sampath .............. H04N 21/643
713/166
10,873,533 B1 * 12/2020 Ismailsheriff .......... H04L 47/27
(Continued)

OTHER PUBLICATIONS

Murugesan Sugeerth et al: "Netostat: analyzing dynamic flow patterns in high-speed networks", Cluster Computing Baltzer Science Publishers, Bussum NL, vol. 25, No. 4, Mar. 25, 2022 (Mar. 25, 2022), pp. 2915-2930, XP037902611, ISSN: 1386-7857, DOI: 10.1007/S10586-022-03543-0 H04L41/142.*
(Continued)

*Primary Examiner* — Kyung H Shin
(74) *Attorney, Agent, or Firm* — Harrity & Harrity, LLP

(57) ABSTRACT

A device may receive network traffic data that includes network traffic packet sizes, and may transform the network traffic data into transformed data. The device may process the transformed data, with a machine learning model, to generate an embedding, and may obtain a similarity metric for the embedding. The device may create a graph with nodes and edges based on the embedding and the similarity metric, and may process the graph, with a community detection model, to identify network traffic categories for the network traffic data. The device may perform one or more actions based on the network traffic categories.

20 Claims, 10 Drawing Sheets

(51) Int. Cl.
  *H04L 43/062* (2022.01)
  *H04L 43/0882* (2022.01)
  *H04L 47/27* (2022.01)
  *H04N 21/643* (2011.01)

(52) U.S. Cl.
  CPC .......... *H04L 43/0882* (2013.01); *H04L 47/27* (2013.01); *H04N 21/643* (2013.01)

(58) Field of Classification Search
  CPC .......... G06N 7/00; G06N 20/10; G06N 20/00; H04N 21/643
  See application file for complete search history.

(56) References Cited

U.S. PATENT DOCUMENTS

| | | | | |
|---|---|---|---|---|
| 2013/0275578 A1* | 10/2013 | Williams | ............ | H04L 43/0882 709/224 |
| 2016/0283859 A1* | 9/2016 | Fenoglio | ................. | H04L 43/04 |
| 2021/0204152 A1 | 7/2021 | Vasudevan et al. | | |

OTHER PUBLICATIONS

Internet Live Stats. 2022. Total number of Websites. https://www.internetlivestats.com/total-number-ofwebsites/.

Flynn, J. 2022. 25 amazing cloud adoption statistics [2022]. Zippia.com. https://www.zippia.com/advice/cloud-adoption-statistics/#Cloud_Adoption_Trends.

Shapira, T. and Shavitt, Y. 2021. FlowPic: A Generic Representation for Encrypted Traffic Classification and Applications Identification. IEEE Transactions on Network and Service Management. 18, 2, 1218-1232.

Girvan, M. and Newman, M.E.J. 2002. Community structure in social and biological networks. Proceedings of the National Academy of Sciences. 99, 12, 7821-7826.

Ahn, S., et al., "Explaining Deep Learning-Based Traffic Classification Using a Genetic Algorithm," IEEE Access, vol. 9, pp. 4738-4751, 2021.

Extended European Search Report for European Application No. EP23218230.3 dated May 23, 2024, 11 pages.

Murugesan, S., et al., "Netostat: analyzing dynamic flow patterns in high-speed networks," Cluster Computing, vol. 22, pp. 2915-2930, 2022.

* cited by examiner

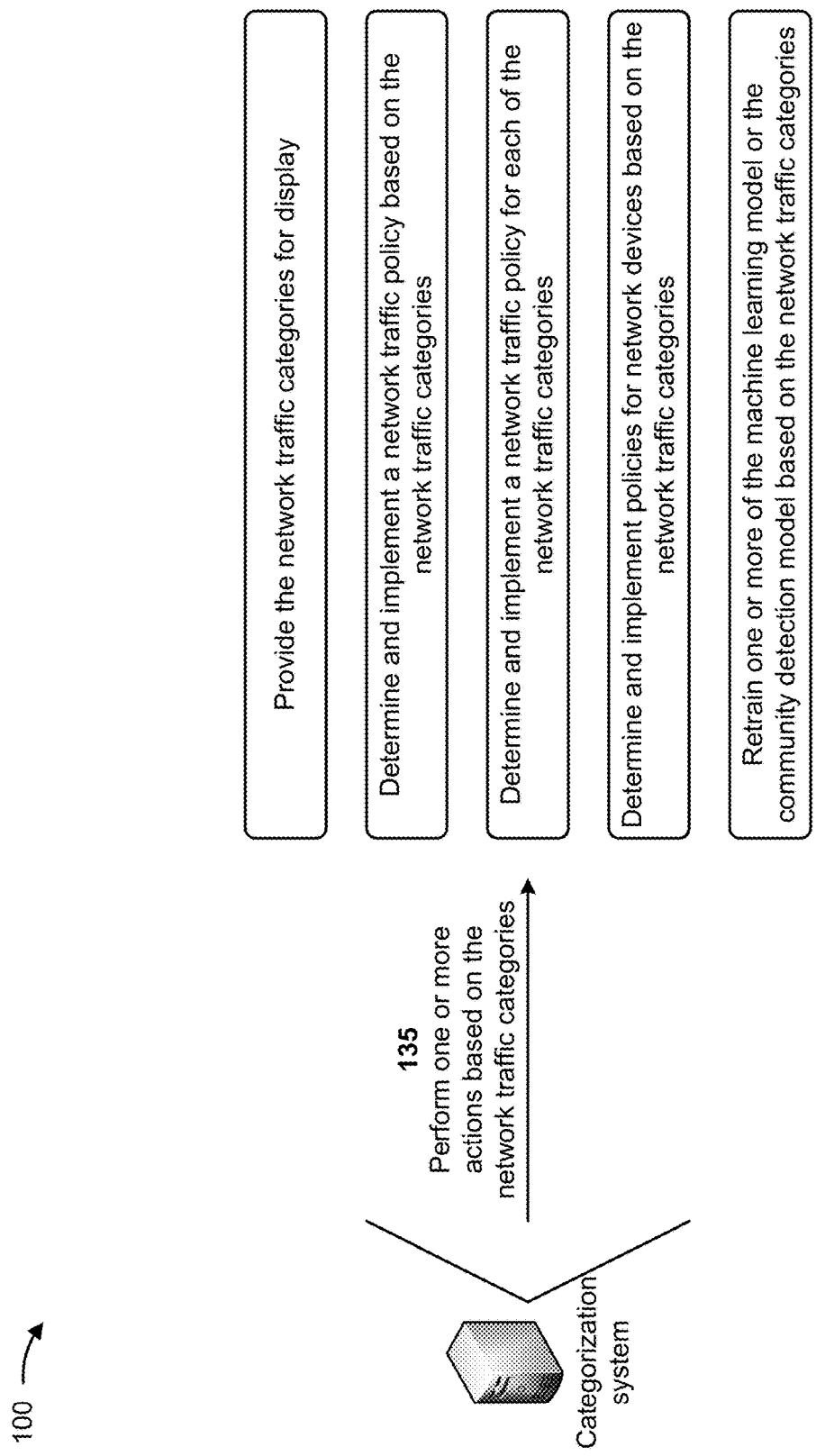

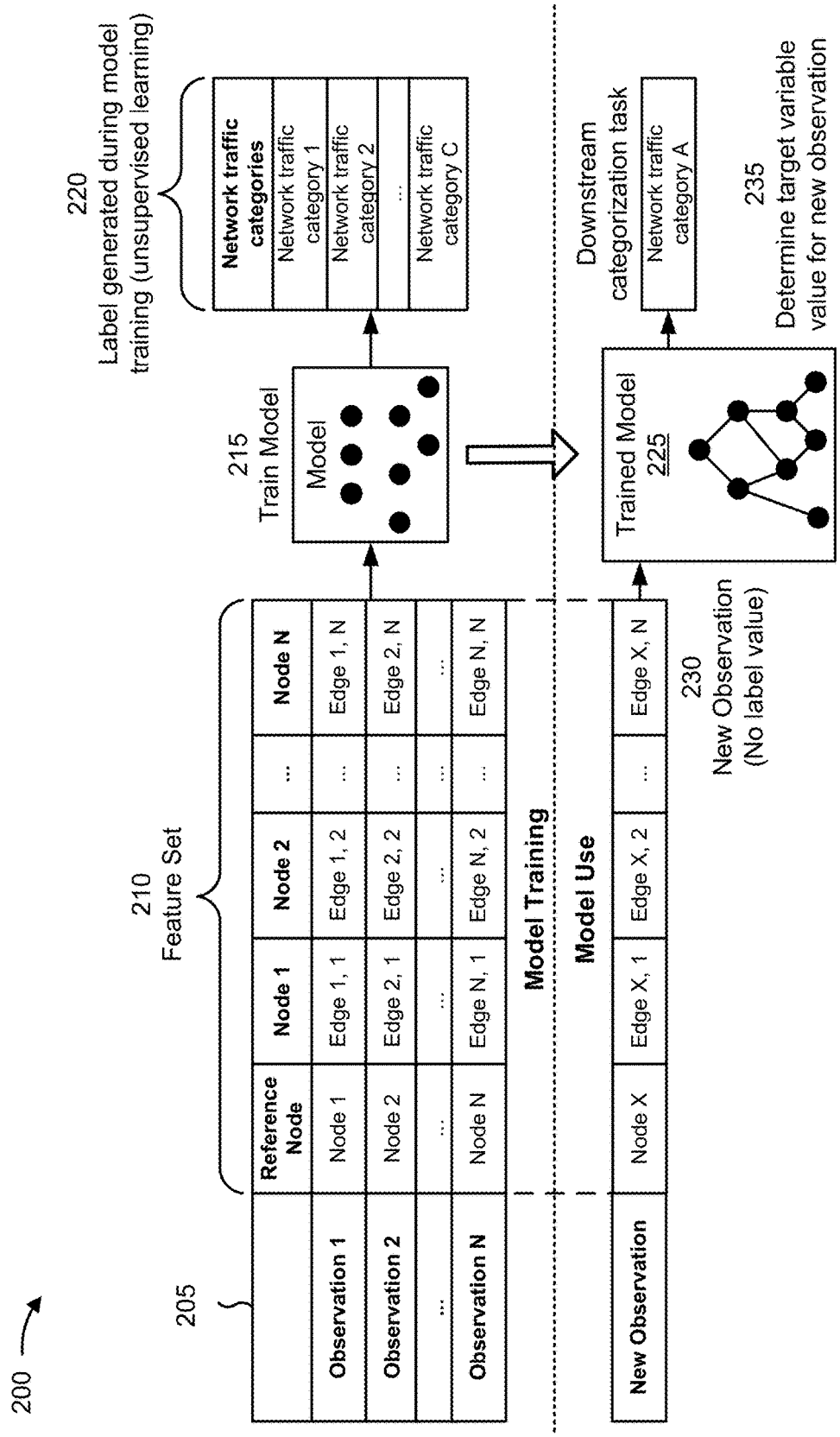

UTILIZING MACHINE LEARNING MODELS FOR NETWORK TRAFFIC CATEGORIZATION

BACKGROUND

Network traffic patterns widely vary with user applications. For example, streaming service users require higher download bandwidth relative to upload bandwidth, whereas video telephony users require comparable download bandwidth and upload bandwidth. Each application type may require different treatment in a network to provide a good experience to end users of the application.

SUMMARY

Some implementations described herein relate to a method. The method may include receiving network traffic data that includes network traffic packet sizes, and transforming the network traffic data into transformed data. The method may include processing the transformed data, with a machine learning model, to generate an embedding, and obtaining a similarity metric for the embedding. The method may include creating a graph with nodes and edges based on the embedding and the similarity metric, and processing the graph, with a community detection model, to identify network traffic categories for the network traffic data. The method may include performing one or more actions based on the network traffic categories.

Some implementations described herein relate to a device. The device may include one or more memories and one or more processors. The one or more processors may be configured to receive network traffic data that includes network traffic packet sizes, and transform the network traffic data into transformed data. The one or more processors may be configured to process the transformed data, with a machine learning model, to generate embedding, and determine a correlation coefficient for the embedding. The one or more processors may be configured to create a graph with nodes and edges based on the embedding and the correlation coefficient, and process the graph, with a community detection model, to identify network traffic categories for the network traffic data. The one or more processors may be configured to perform one or more actions based on the network traffic categories.

Some implementations described herein relate to a non-transitory computer-readable medium that stores a set of instructions for a device. The set of instructions, when executed by one or more processors of the device, may cause the device to receive network traffic data that includes network traffic packet sizes, and transform the network traffic data into transformed data. The set of instructions, when executed by one or more processors of the device, may cause the device to process the transformed data, with a machine learning model, to generate an embedding, and obtain a similarity metric for the embedding. The set of instructions, when executed by one or more processors of the device, may cause the device to convert the embedding into nodes of a graph, and define edges between the nodes of the graph based on the similarity metric. The set of instructions, when executed by one or more processors of the device, may cause the device to process the graph, with a community detection model, to identify network traffic categories for the network traffic data, and perform one or more actions based on the network traffic categories.

BRIEF DESCRIPTION OF THE DRAWINGS

FIGS. 1A-1F are diagrams of an example associated with utilizing machine learning models for network traffic categorization.

FIG. 2 is a diagram illustrating an example of training and using a machine learning model.

DETAILED DESCRIPTION

Figure 1A:
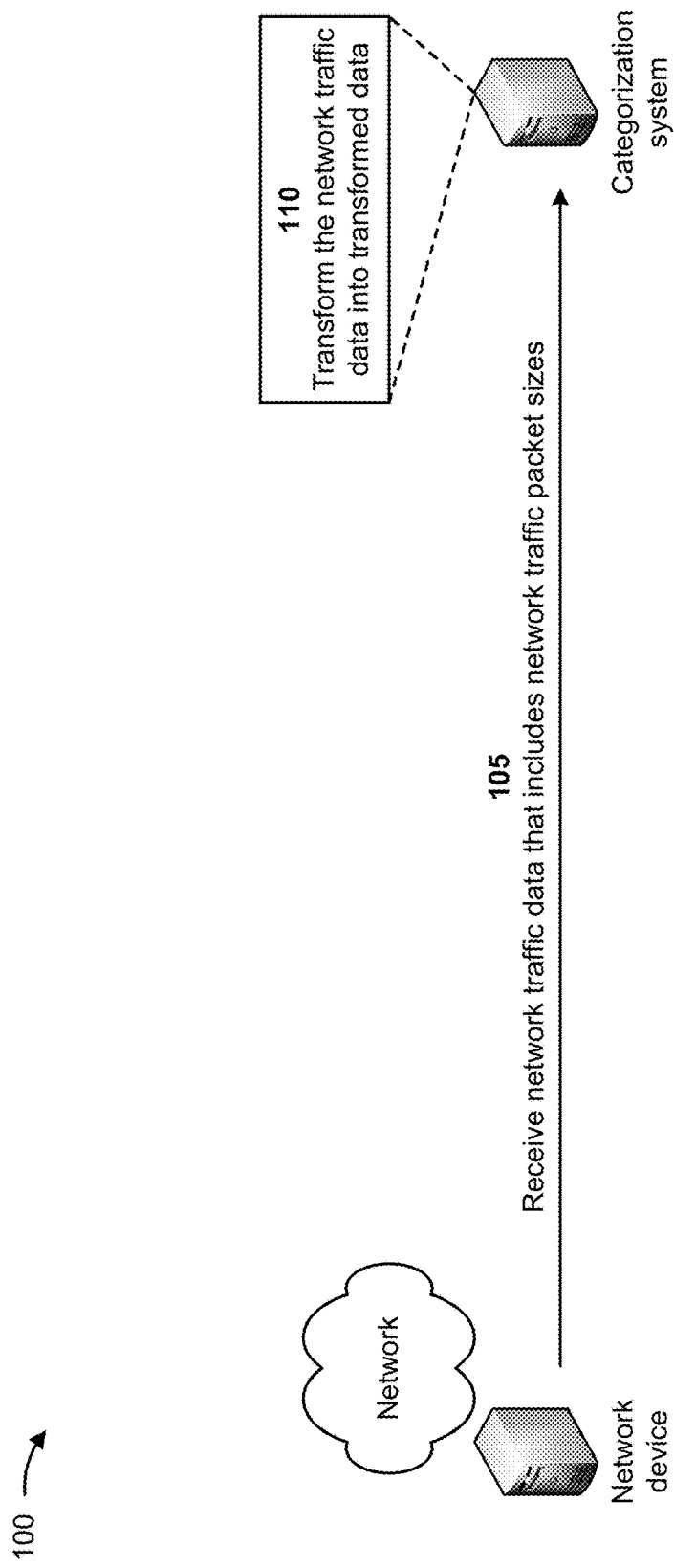

The following detailed description of example implementations refers to the accompanying drawings. The same reference numbers in different drawings may identify the same or similar elements.

Providing good experiences to end users of different applications requires determination of network traffic categories associated with the different applications. One technique for determining network traffic categories includes utilizing application information to determine network traffic categories. Although application information is useful, obtaining application information from network traffic is challenging. For example, current technologies that utilize traffic content for identifying application types may violate privacy. Further, utilization of encrypted traffic is more common for applications. Moreover, network traffic patterns for an application may evolve over time due to new versions and/or features. Thus, network traffic categorization based on application information faces multiple limitations.

Another technique for determining network traffic categories includes manually creating catalogs of applications and application categories (e.g., define the number of categories and map applications to the categories based on prior domain knowledge of the applications), and identifying applications based on the catalogs, network traffic content, network traffic header information (e.g., network addresses and host names), and/or the like. However, there are scalability and adaptability issues associated with creating application catalogs. The quantity of applications increases over time, and updates to applications may change network patterns. Furthermore, identifying applications from traffic content may raise privacy concerns, and encryption of network traffic makes identifying applications more difficult.

Thus, current techniques for determining network traffic categories consume computing resources (e.g., processing resources, memory resources, communication resources, and/or the like), networking resources, and/or the like, associated with incorrectly categorizing network traffic, handling privacy issues associated with categorizing network traffic, handling encryption issues associated with categorizing network traffic, incorrectly modifying a network based on incorrectly categorized network traffic, requiring manually creating catalogs of application categories, and/or the like.

Some implementations described herein relate to a categorization system that utilizes machine learning models for network traffic categorization from the data itself. For example, the categorization system may receive network traffic data that includes network traffic packet sizes, and may transform the network traffic data into transformed data. The categorization system may process the transformed data, with a machine learning model, to generate an embedding, and may obtain a similarity metric for the embedding. The categorization system may create a graph with nodes and edges based on the embedding and the similarity metric, and may process the graph, with a community detection model, to identify network traffic categories for the network traffic data. The categorization system may perform one or more actions based on the network traffic categories.

In this way, the categorization system may utilize machine learning models for network traffic categorization. For example, the categorization system may utilize data embedding to transform network traffic patterns into low dimensional vectors, and may determine similarities of the network traffic from the low dimensional vectors. The categorization system may utilize a graph theoretical model to categorize network traffic using the low dimensional vectors. The categorization system may automatically determine network traffic categories from the network traffic, as opposed to relying on prior domain knowledge of applications and application categories. Thus, the categorization system conserves computing resources, networking resources, and/or the like that would otherwise have been consumed by incorrectly categorizing network traffic, handling privacy issues associated with categorizing network traffic, handling encryption issues associated with categorizing network traffic, incorrectly modifying a network based on incorrectly categorized network traffic, and/or the like.

FIGS. 1A-1F are diagrams of an example 100 associated with utilizing machine learning models for network traffic categorization. As shown in FIGS. 1A-1F, example 100 includes a categorization system associated with a network device and a network. The categorization system may include a system that utilizes machine learning models for network traffic categorization. Further details of the categorization system, the network device, and the network are provided elsewhere herein.

As shown in FIG. 1A, and by reference number 105, the categorization system may receive network traffic data that includes network traffic packet sizes. For example, the network may provide different applications to users of the network, and the different applications may be associated with different network traffic categories. Provision and utilization of the different applications may generate the network traffic data that includes network traffic packet sizes. The network device (e.g., a network control system, a cloud-based control system, and/or the like) may periodically receive the network traffic data from the network, may continuously receive the network traffic data from the network, may receive the network traffic data based on providing a request for the network traffic data to the network, and/or the like. The categorization system, in turn, may periodically receive the network traffic data from the network device, may continuously receive the network traffic data from the network device, may receive the network traffic data based on providing a request for the network traffic data to the network device, and/or the like. Although implementations are described herein in connection with network traffic data that includes network traffic packet sizes, in some implementations, other forms of network traffic data may be utilized that are dependent on a machine learning model to be utilized for generating an embedding, as described elsewhere herein.

As further shown in FIG. 1A, and by reference number 110, the categorization system may transform the network traffic data into transformed data. For example, the categorization system may include a data transformation component that transforms the network traffic data into the transformed data. In some implementations, when transforming the network traffic data into the transformed data, the categorization system may transform the network traffic data into a format capable of being processed by a machine learning model (e.g., a deep learning model), as described elsewhere herein. In some implementations, when transforming the network traffic data into the transformed data, the categorization system may transform the network traffic packet sizes into images that correspond to the transformed data. For example, the categorization system may transform the network traffic packet sizes into images (e.g., color images, such as a FlowPic) by transforming the network traffic packet sizes into a histogram of packet sizes, over sliding time window, and color-coding the packet sizes. In some implementations, the categorization system may transform the network traffic data into other types of transformed data.

Figure 1B:
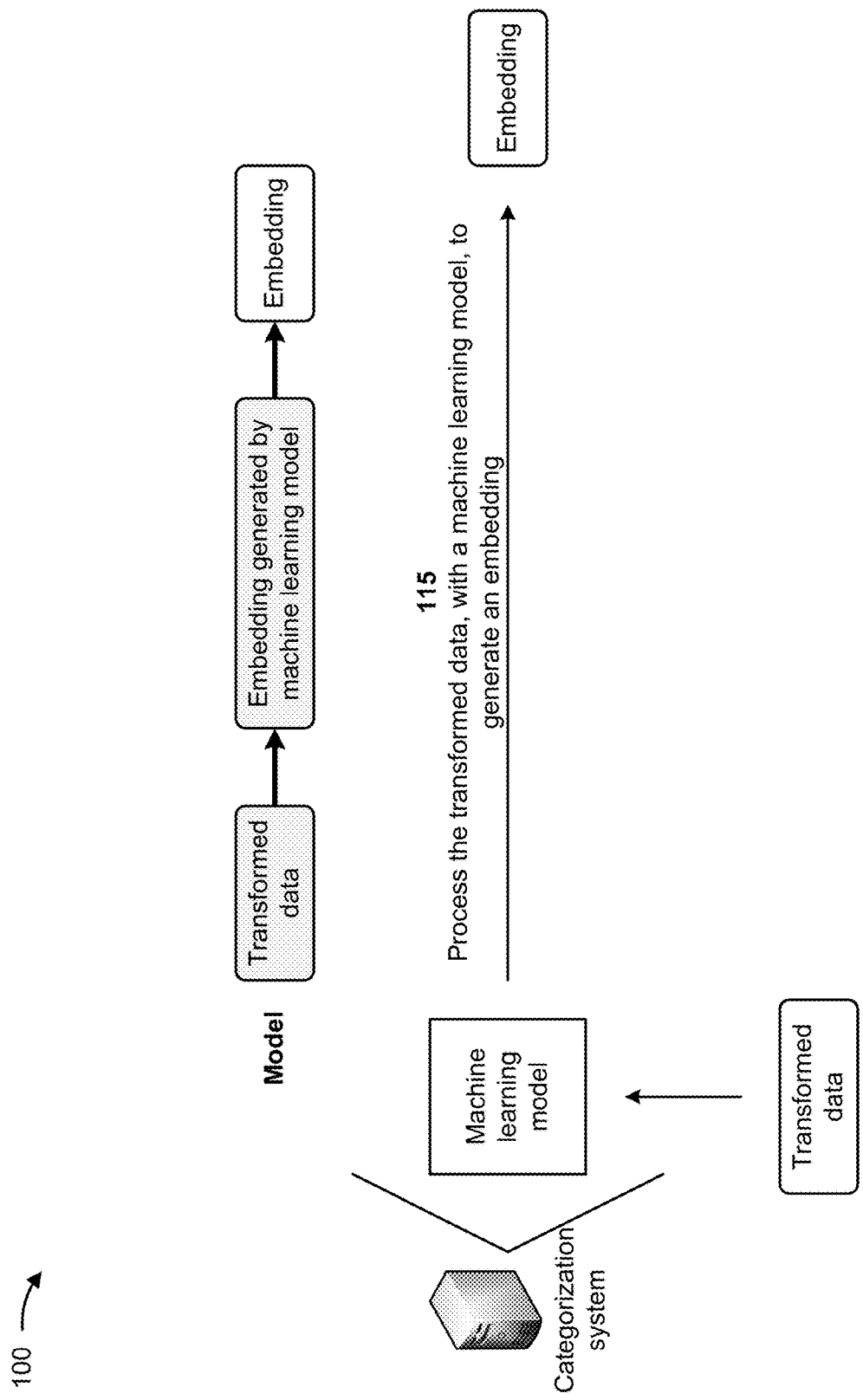

As shown in FIG. 1B, and by reference number 115, the categorization system may process the transformed data, with a machine learning model, to generate embedding. For example, the categorization system may include a data embedding block that includes a machine learning model that generates the embedding based on the transformed data. An embedding may include a relatively low-dimensional representation of high dimensional data. In some implementations, when processing the transformed data, with the machine learning model, to generate the embedding, the categorization system may process the transformed data, with the machine learning model, to identify information for categorizing the network traffic data without prior knowledge of the network traffic categories. A conventional approach for categorizing network traffic is to utilize a supervised classification model to predict network traffic categories that are predefined by network experts. In contrast, the machine learning model may utilize other available data, rather than manually labeled network categories, to obtain the embedding (e.g., an embedding vector). The embedding refers to core data that represent the raw data in a succinct and relational manner. An embedding may be used in natural language processing to represent word vocabulary comprising of high dimensional independent vectors (thousand or million dimension) as low dimensional vectors (the order of tens) while infusing a relationship among the embedding vectors. As further shown in FIG. 1B, the transformed data may be utilize embedding by machine learning to generate the embedding. Other forms of machine learning models may be utilized for generating the embedding.

In some implementations, when processing the transformed data, with the machine learning model, to generate the embedding, the categorization system may process the transformed data, with a first model (e.g., a two-dimensional convolutional model with max-pooling dropout), to generate the embedding. For example, the first model may classify an application name, and may obtain an n-dimensional embedding vector (e.g., the embedding) prior to an output layer of the first model. In doing so, an image may be represented by an n-dimensional embedding vector. Alternatively, when processing the transformed data, with the machine learning model, to generate the embedding, the categorization system may process the transformed data, with a second model (e.g., an autoencoder model), to generate the embedding. The second model may include data encoding followed by data decoding to reconstruct an original input image. An n-dimensional embedding vector (e.g., the embedding) may be generated between the data encoding and the data decoding.

Figure 1C:
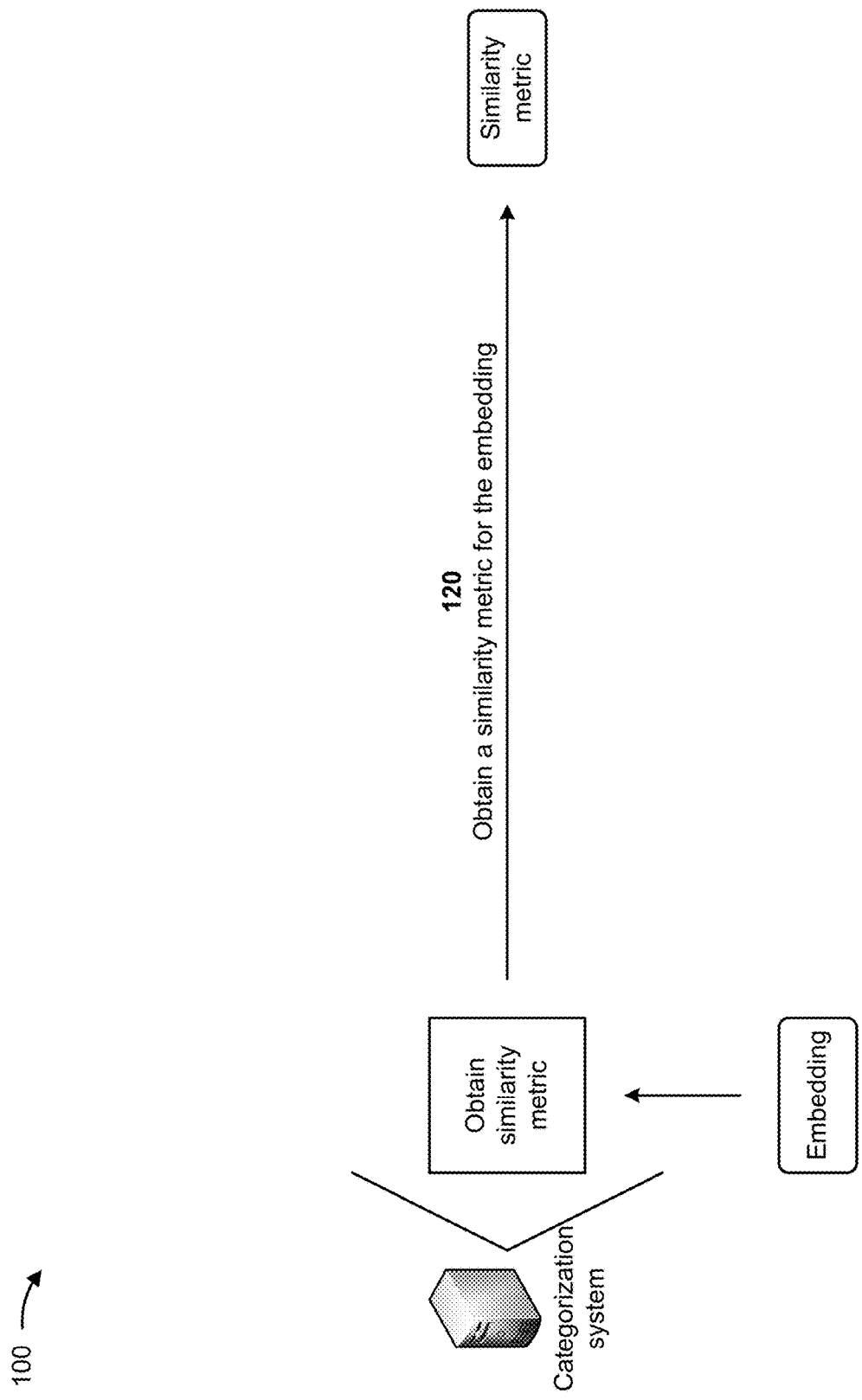

As shown in FIG. 1C, and by reference number 120, the categorization system may obtain a similarity metric for the embedding. For example, when obtaining the similarity metric for the embedding, the categorization system may obtain a correlation coefficient as the similarity metric for the embedding. A correlation coefficient may be a statistical measure of a strength of relationship between two variables. In some implementations, the categorization system may utilize a bivariate analysis that measures a strength of association (e.g., a correlation coefficient) between two data points of the embedding and a direction of a relationship between the two data points. In terms of the strength of relationship, the value of the correlation coefficient may vary between +1 and −1. A value of ±1 may indicate a perfect degree of association between the two data points. As the correlation coefficient value goes towards 0, the relationship between the two data points will be weaker. The direction of the relationship may be indicated by the sign of the correlation coefficient, where a positive (+) sign may indicate a positive relationship and a negative (−) sign may indicate a negative relationship. In some implementations, the correlation coefficient may include a Pearson correlation coefficient, a Kendall rank correlation coefficient, a Spearman correlation coefficient, and/or a Point-Biserial correlation coefficient.

Figure 1D:
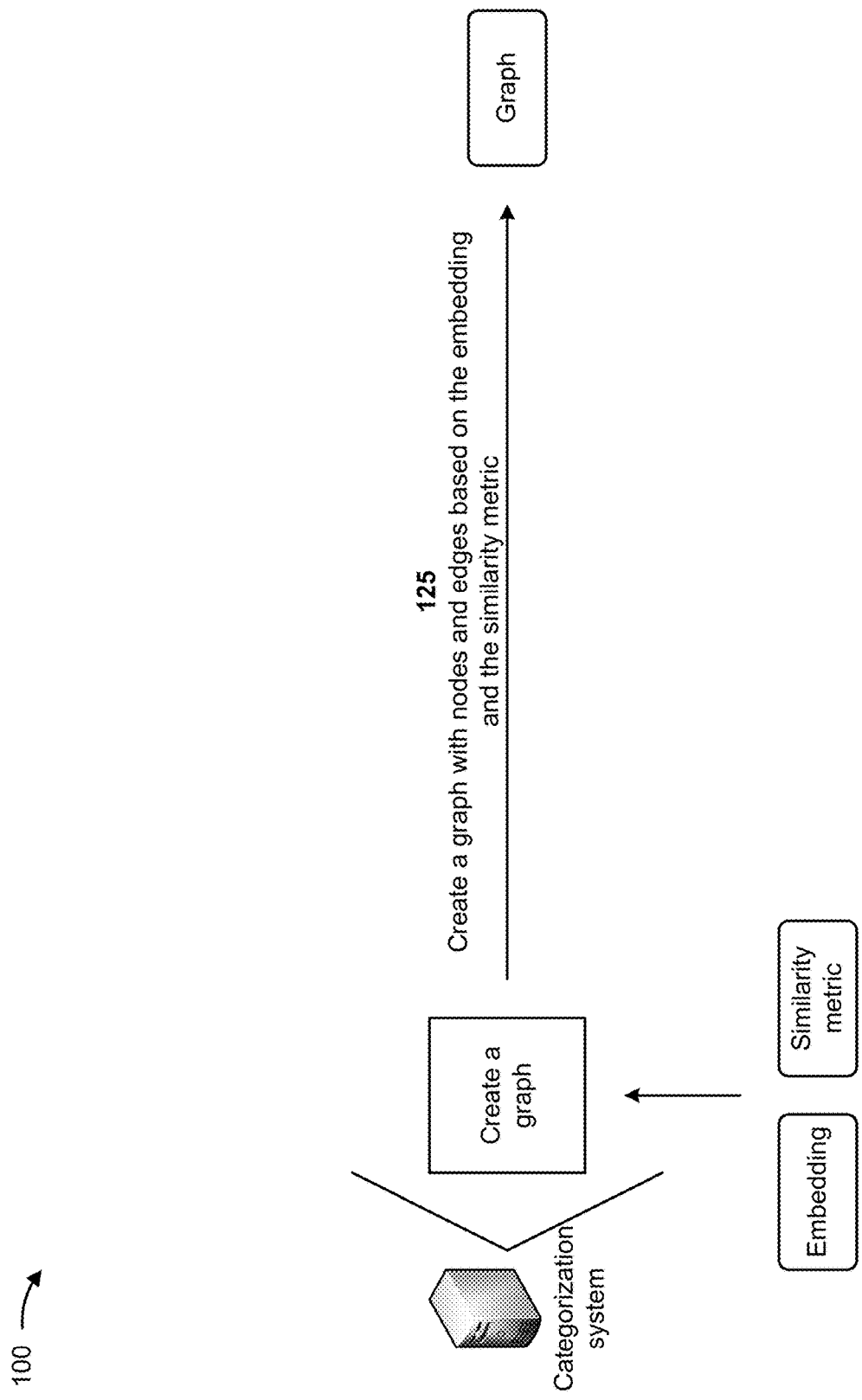

As shown in FIG. 1D, and by reference number 125, the categorization system may create a graph with nodes and edges based on the embedding and the similarity metric. For example, the categorization system may utilize the embedding and the similarity metric (e.g., the correlation coefficient) to construct the graph with the nodes and the edges. In some implementations, when creating the graph with the nodes and the edges based on the embedding and the similarity metric, the categorization system may convert the embedding into the nodes of the graph. The categorization system may define the edges between the nodes of the graph based on the similarity metric, and may construct the graph based on the nodes and the edges. In this way, instead of utilizing the embedding (e.g., vector coordinates) to determine network traffic categories, the categorization system may utilize the graph to determine network traffic categories.

Figure 1E:
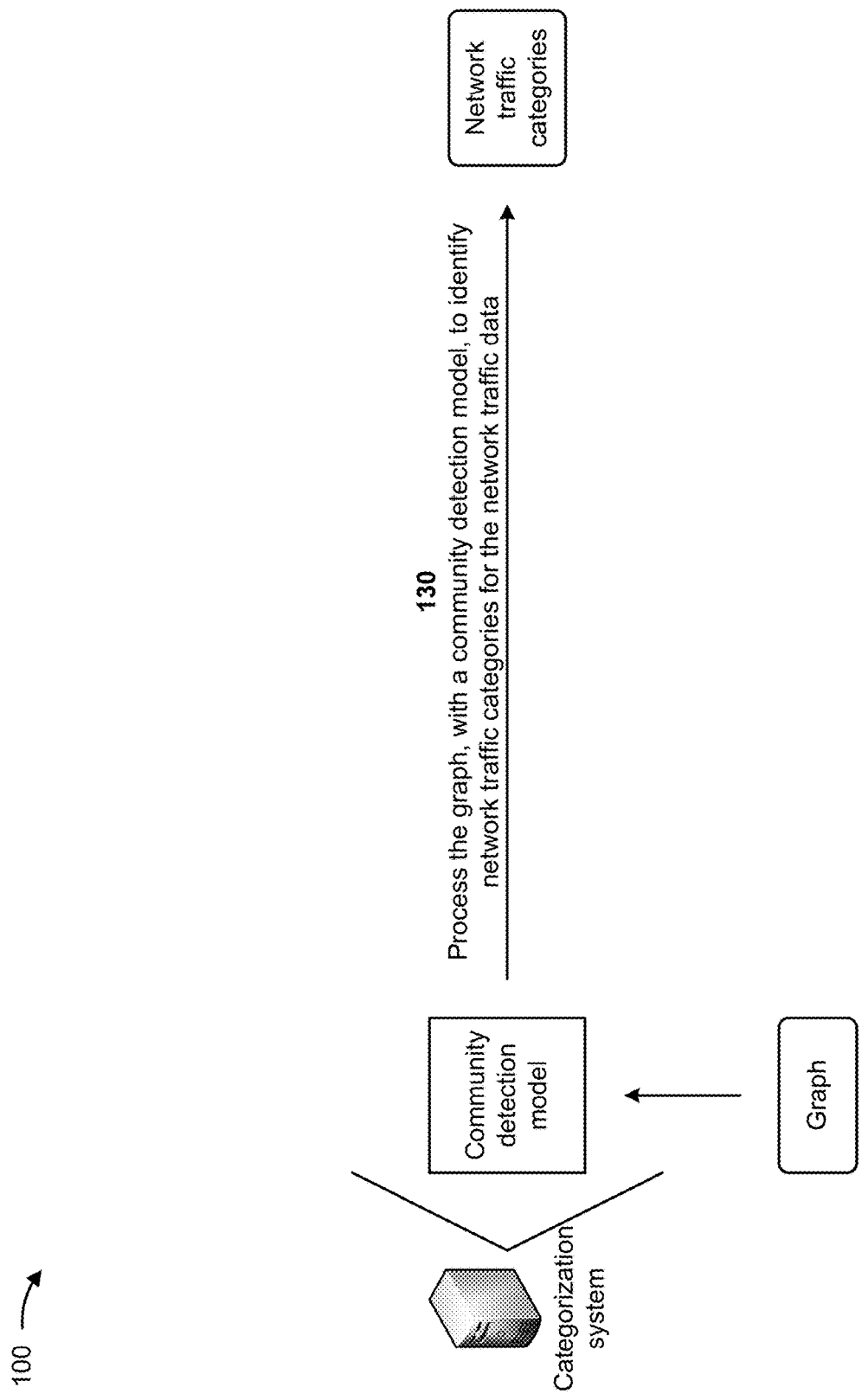

As shown in FIG. 1E, and by reference number 130, the categorization system may process the graph, with a community detection model, to identify network traffic categories for the network traffic data. For example, the categorization system may utilize the community detection model to identify the network traffic categories for the network traffic data based on the constructed graph. A community detection model may include a model that evaluates how groups of nodes are clustered or partitioned, as well as a tendency of the groups to strengthen or break apart. A community detection model has been applied to social and biological networks based on determining that such networks exhibit the property of a community structure. The community detection model may be advantageous over conventional clustering approaches since the community detection model does not require a priori selection of a total quantity of communities. In other words, the community detection model enables determination of a total number of network traffic categories automatically from the network traffic data.

In some implementations, when processing the graph, with the community detection model, to identify the network traffic categories for the network traffic data, the categorization system may process the graph, with the community detection model, to determine a quantity of the network traffic categories for the network traffic data without prior selection of the quantity of the network traffic categories. In some implementations, when processing the graph, with the community detection model, to identify the network traffic categories for the network traffic data, the categorization system may process the graph, with the community detection model, to determine a quantity of the network traffic categories automatically from the network traffic data.

In this way, the categorization system enables determination of network policies in an adaptive manner and without acquiring prior knowledge of network categories. Network patterns of applications evolve over time. When new applications are developed, new network traffic patterns are generated. Application updates can also lead to changes in network patterns. The categorization system provides a data-driven framework to categorize network traffic and adapt to evolving network patterns. As opposed to manually revising application catalogs and network categories periodically to adapt to evolving network traffic categories, the categorization system automatically identifies network traffic categories from network traffic data.

As shown in FIG. 1F, and by reference number 135, the categorization system may perform one or more actions based on the network traffic categories. In some implementations, performing the one or more actions includes the categorization system providing the network traffic categories for display. For example, the categorization system may provide the network traffic categories to a user device associated with a network technician, and the user device may display the network traffic categories to the network technician. The network technician may utilize the network traffic categories to determine a network policy for the network. In this way, the categorization system conserves computing resources, networking resources, and/or the like that would otherwise have been consumed by incorrectly categorizing network traffic.

In some implementations, performing the one or more actions includes the categorization system determining and implementing a network traffic policy based on the network traffic categories. For example, the categorization system may determine a network traffic policy (e.g., provide more transmission resources to a streaming application) based on the network traffic categories (e.g., a category identifying the streaming application and requirements of the streaming application). The categorization system may cause the network to implement the network traffic policy so that more transmission resources are allocated to the streaming application. In this way, the categorization system conserves computing resources, networking resources, and/or the like that would otherwise have been consumed by incorrectly modifying a network based on incorrectly categorized network traffic.

In some implementations, performing the one or more actions includes the categorization system determining and implementing a network traffic policy for each of the network traffic categories. For example, the categorization system may determine a different network traffic policy (e.g., provide more transmission resources to a streaming application and less transmission resources for a browser application) for each of the network traffic categories (e.g., a category identifying the streaming application and requirements of the streaming application, and a category identifying the browser application and requirements of the browser application). The categorization system may cause the network to implement the different network traffic policies so that more transmission resources are allocated to the streaming application and less transmission resources are allocated to the applications like chat which require less bandwidth. In this way, the categorization system conserves computing resources, networking resources, and/or the like that would otherwise have been consumed by incorrectly modifying a network based on incorrectly categorized network traffic.

In some implementations, performing the one or more actions includes the categorization system determining and implementing policies for network devices based on the network traffic categories. For example, the categorization system may determine policies for network devices of the network (e.g., changing a quality of service (QoS) or bandwidths for network devices providing a gaming application) based on the network traffic categories (e.g., a category identifying the gaming application and QoS/bandwidth requirements of the gaming application). The categorization system may cause the network devices to implement the policies so that QoS/bandwidth requirements of the gaming application are achieved. In this way, the categorization system conserves computing resources, networking resources, and/or the like that would otherwise have been consumed by incorrectly categorizing network traffic.

In some implementations, performing the one or more actions includes the categorization system retraining one or more of the machine learning model or the community detection model based on the network traffic categories. For example, the categorization system may utilize the network traffic categories as additional training data for retraining one or more of the machine learning model or the community detection model, thereby increasing the quantity of training data available for training one or more of the machine learning model or the community detection model. Accordingly, the categorization system may conserve computing resources associated with identifying, obtaining, and/or generating historical data for training one or more of the machine learning model or the community detection model relative to other systems for identifying, obtaining, and/or generating historical data for training machine learning models.

In this way, the categorization system may utilize machine learning models for network traffic categorization. For example, the categorization system may utilize data embedding to transform network traffic patterns into low dimensional vectors, and may determine similarities of the network traffic from the low dimensional vectors. The categorization system may utilize a graph theoretical model to categorize network traffic using the low dimensional vectors. The categorization system may automatically determine network traffic categories from the network traffic, as opposed to relying on prior domain knowledge of applications and application categories. Thus, the categorization system conserves computing resources, networking resources, and/or the like that would otherwise have been consumed by incorrectly categorizing network traffic, handling privacy issues associated with categorizing network traffic, handling encryption issues associated with categorizing network traffic, incorrectly modifying a network based on incorrectly categorized network traffic, and/or the like.

As indicated above, FIGS. 1A-1F are provided as an example. Other examples may differ from what is described with regard to FIGS. 1A-1F. The number and arrangement of devices shown in FIGS. 1A-1F are provided as an example. In practice, there may be additional devices, fewer devices, different devices, or differently arranged devices than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) shown in FIGS. 1A-1F may perform one or more functions described as being performed by another set of devices shown in FIGS. 1A-1F.

FIG. 2 is a diagram illustrating an example 200 of training and using a machine learning model to determine network traffic categories. The machine learning model training and usage described herein may be performed using a machine learning system. The machine learning system may include or may be included in a computing device, a server, a cloud computing environment, and/or the like, such as the categorization system described in more detail elsewhere herein.

As shown by reference number 205, a machine learning model may be trained using a set of observations. The set of observations may be obtained from historical data, such as data gathered during one or more processes described herein. In some implementations, the machine learning system may receive the set of observations (e.g., as input) from the categorization system, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the categorization system. For example, the machine learning system may identify a feature set (e.g., one or more features and/or feature values) by extracting the feature set from structured data, by performing natural language processing to extract the feature set from unstructured data, by receiving input from an operator, and/or the like.

As an example, a feature set for a set of observations may include a first feature of nodes, a second feature of similarity (e.g., edges) between the given node and each of the other nodes from the historical data, and so on. As shown, for a first observation, the first feature may have a value of node 1, the second feature may have a value of edges between node 1 and each of the other nodes 1 through N, and so on. These features and feature values are provided as examples and may differ in other examples. As shown by reference number 215, the machine learning model may be trained with the set of observations.

As shown by reference number 220, the set of observations may be associated with a label. The label may represent a variable having a numeric value, may represent a variable having a numeric value that falls within a range of values or has some discrete possible values, may represent a variable that is selectable from one of multiple options (e.g., one of multiple classes, classifications, labels, and/or the like), may represent a variable having a Boolean value, and/or the like. A label may be associated with a label value, and a label may be specific to an observation. In example 200, the label of network traffic categories has a value of network traffic categories 1 for the first observation, and the total number of possible categories is C.

The label may represent a value that a machine learning model is being trained to predict, and the feature set may represent the variables that are input to a trained machine learning model to predict a value for label. The set of observations may include label values so that the machine learning model can be trained to recognize patterns in the feature set that lead to a target variable value. A machine learning model that utilizes labels in training observations may be referred to as a supervised learning model. Note that labeling the observations typically requires significant amount of time and efforts by human, thus labels are often unavailable in industry.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using association to identify related groups of items within the set of observations. The implementations described herein pertain to unsupervised learning in which labels are automatically generated by a model.

As shown by reference number 215, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, and/or the like. After training, the machine learning system may store the machine learning model as a trained machine learning model 225 to be used to analyze new observations. The implementations described herein pertain to a neural network based on graph structure of the observations, and the machine learning system generates labels for observations.

As shown by reference number 230, the machine learning system may apply the trained machine learning model 225 to a new observation, such as by receiving a new observation and inputting the new observation to the trained machine learning model 225. As shown, the new observation may include a first feature of reference node X, a second feature of a value of edges between node X and each of the other nodes 1 through N from the existing observations, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a label. Additionally, or alternatively, the output may include information that identifies a category to which the new observation belongs, information that indicates a degree of similarity between the new observation and one or more other observations, and/or the like.

As an example, the trained machine learning model 225 may predict a value of network traffic categories A for the label of the network traffic categories for the new observation, as shown by reference number 235. Based on this prediction, the machine learning system may provide a first recommendation, may provide output for determination of a first recommendation, may perform a first automated action, may cause a first automated action to be performed (e.g., by instructing another device to perform the automated action), and/or the like.

In some implementations, the recommendation and/or the automated action associated with the new observation may be based on a label value having a particular label (e.g., classification, categorization, and/or the like), may be based on whether a label value satisfies one or more thresholds (e.g., whether the target variable value is greater than a threshold, is less than a threshold, is equal to a threshold, falls within a range of threshold values, and/or the like), may be based on a category in which the new observation is classified, and/or the like.

In this way, the machine learning system may apply a rigorous and automated process to determine the network traffic categories. The machine learning system enables recognition and/or identification of tens, hundreds, thousands, or millions of features and/or feature values for tens, hundreds, thousands, or millions of observations, thereby increasing accuracy and consistency and reducing delay associated with determining the network traffic categories relative to requiring computing resources to be allocated for tens, hundreds, or thousands of operators to manually determine the network traffic categories.

As indicated above, FIG. 2 is provided as an example. Other examples may differ from what is described in connection with FIG. 2.

Figure 3:
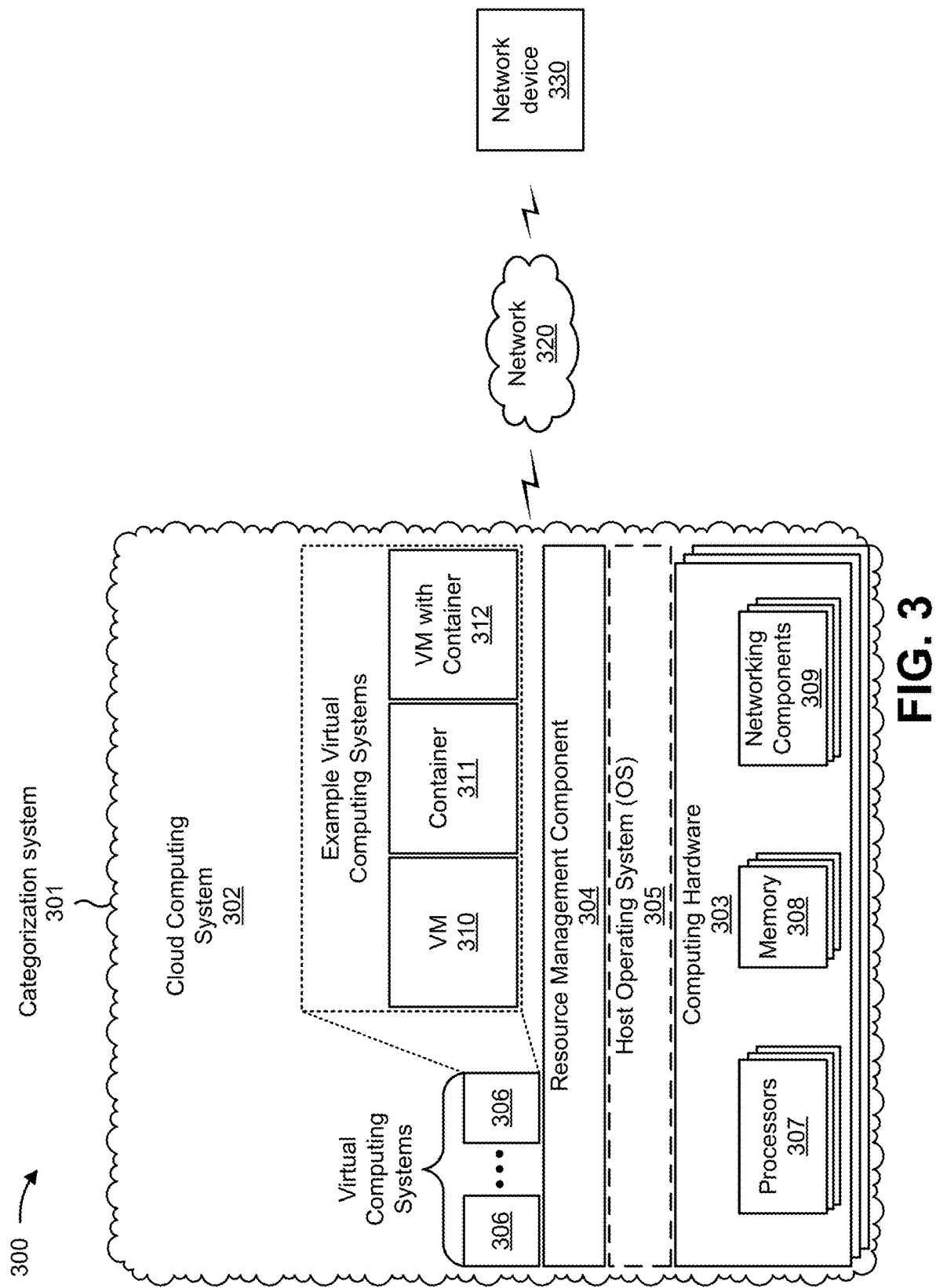
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a categorization system 301, which may include one or more elements of and/or may execute within a cloud computing system 302. The cloud computing system 302 may include one or more elements 303-312, as described in more detail below. As further shown in FIG. 3, environment 300 may include a network 320 and/or a network device 330. Devices and/or elements of environment 300 may interconnect via wired connections and/or wireless connections.

The cloud computing system 302 includes computing hardware 303, a resource management component 304, a host operating system (OS) 305, and/or one or more virtual computing systems 306. The cloud computing system 302 may execute on, for example, an Amazon Web Services platform, a Microsoft Azure platform, or a Snowflake platform. The resource management component 304 may perform virtualization (e.g., abstraction) of computing hardware 303 to create the one or more virtual computing systems 306. Using virtualization, the resource management component 304 enables a single computing device (e.g., a computer or a server) to operate like multiple computing devices, such as by creating multiple isolated virtual computing systems 306 from computing hardware 303 of the single computing device. In this way, computing hardware 303 can operate more efficiently, with lower power consumption, higher reliability, higher availability, higher utilization, greater flexibility, and lower cost than using separate computing devices.

Computing hardware 303 includes hardware and corresponding resources from one or more computing devices. For example, computing hardware 303 may include hardware from a single computing device (e.g., a single server) or from multiple computing devices (e.g., multiple servers), such as multiple computing devices in one or more data centers. As shown, computing hardware 303 may include one or more processors 307, one or more memories 308, and/or one or more networking components 309. Examples of a processor, a memory, and a networking component (e.g., a communication component) are described elsewhere herein.

The resource management component 304 includes a virtualization application (e.g., executing on hardware, such as computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, or another type of hypervisor) or a virtual machine monitor, such as when the virtual computing systems 306 are virtual machines 310. Additionally, or alternatively, the resource management component 304 may include a container manager, such as when the virtual computing systems 306 are containers 311. In some implementations, the resource management component 304 executes within and/or in coordination with a host operating system 305.

A virtual computing system 306 includes a virtual environment that enables cloud-based execution of operations and/or processes described herein using computing hardware 303. As shown, a virtual computing system 306 may include a virtual machine 310, a container 311, or a hybrid environment 312 that includes a virtual machine and a container, among other examples. A virtual computing system 306 may execute one or more applications using a file system that includes binary files, software libraries, and/or other resources required to execute applications on a guest operating system (e.g., within the virtual computing system 306) or the host operating system 305.

Although the categorization system 301 may include one or more elements 303-312 of the cloud computing system 302, may execute within the cloud computing system 302, and/or may be hosted within the cloud computing system 302, in some implementations, the categorization system 301 may not be cloud-based (e.g., may be implemented outside of a cloud computing system) or may be partially cloud-based. For example, the categorization system 301 may include one or more devices that are not part of the cloud computing system 302, such as device 400 of FIG. 4, which may include a standalone server or another type of computing device. The categorization system 301 may perform one or more operations and/or processes described in more detail elsewhere herein.

Network 320 includes one or more wired and/or wireless networks. For example, network 320 may include a cellular network, a public land mobile network (PLMN), a local area network (LAN), a wide area network (WAN), a private network, the Internet, and/or a combination of these or other types of networks. The network 320 enables communication among the devices of environment 300.

The network device 330 may include one or more devices capable of receiving, processing, storing, routing, and/or providing traffic (e.g., a packet and/or other information or metadata) in a manner described herein. For example, the network device 330 may include a router, such as a label switching router (LSR), a label edge router (LER), an ingress router, an egress router, a provider router (e.g., a provider edge router or a provider core router), a virtual router, or another type of router. Additionally, or alternatively, the network device 330 may include a gateway, a switch, a firewall, a hub, a bridge, a reverse proxy, a server (e.g., a proxy server, a cloud server, or a data center server), a load balancer, and/or a similar device. In some implementations, the network device 330 may be a physical device implemented within a housing, such as a chassis. In some implementations, the network device 330 may be a virtual device implemented by one or more computing devices of a cloud computing environment or a data center. In some implementations, a group of network devices 330 may be a group of data center nodes that are used to route traffic flow through a network.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
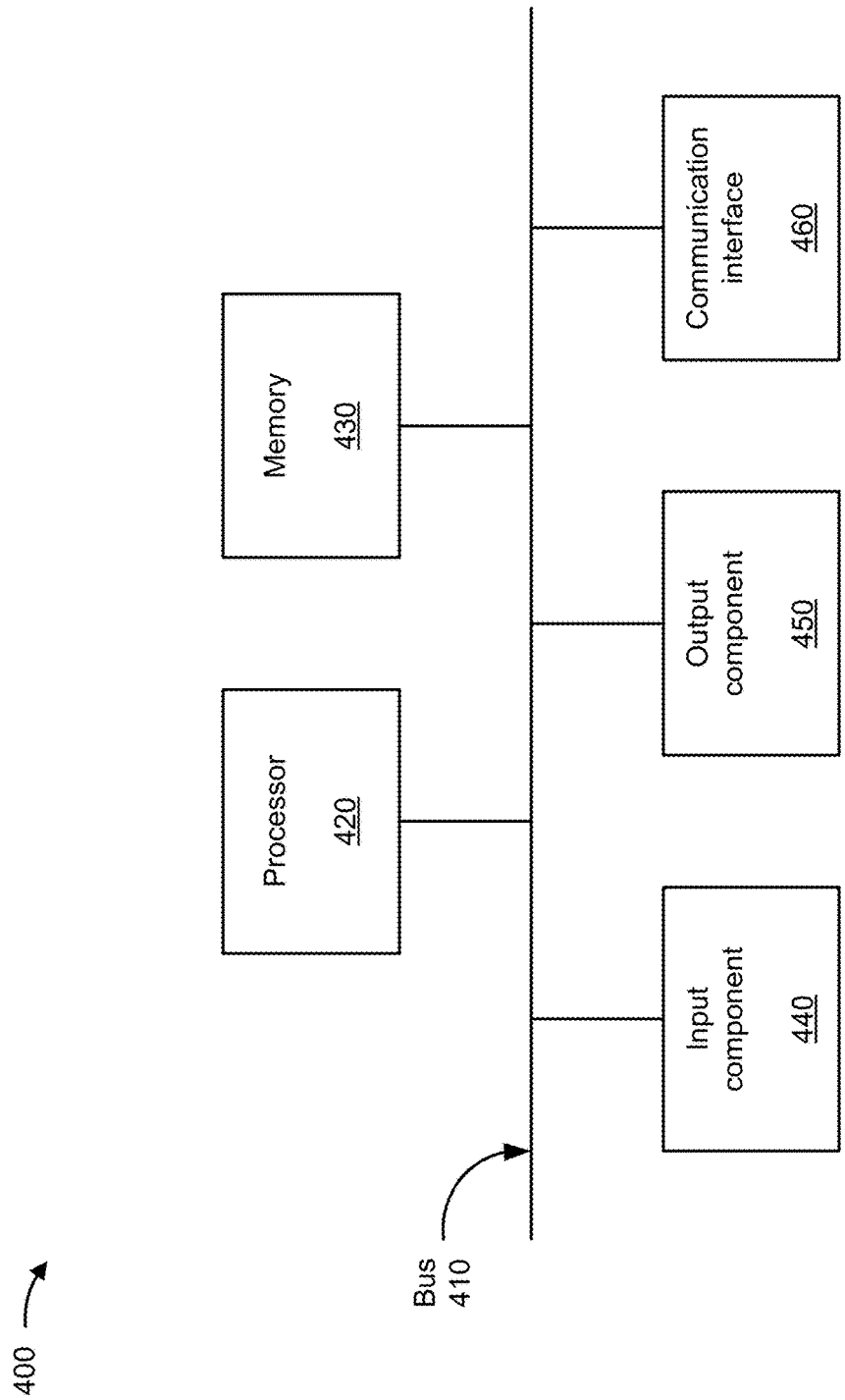
FIG. 4 is a diagram of example components of one or more devices of FIG. 3.

FIG. 4 is a diagram of example components of one or more devices of FIG. 3. The example components may be included in a device 400, which may correspond to the categorization system 301 and/or the network device 330. In some implementations, the categorization system 301 and/or the network device 330 may include one or more devices 400 and/or one or more components of the device 400. As shown in FIG. 4, the device 400 may include a bus 410, a processor 420, a memory 430, an input component 440, an output component 450, and a communication interface 460.

The bus 410 includes one or more components that enable wired and/or wireless communication among the components of the device 400. The bus 410 may couple together two or more components of FIG. 4, such as via operative coupling, communicative coupling, electronic coupling, and/or electric coupling. The processor 420 includes a central processing unit, a graphics processing unit, a microprocessor, a controller, a microcontroller, a digital signal processor, a field-programmable gate array, an application-specific integrated circuit, and/or another type of processing component. The processor 420 is implemented in hardware, firmware, or a combination of hardware and software. In some implementations, the processor 420 includes one or more processors capable of being programmed to perform one or more operations or processes described elsewhere herein.

The memory 430 includes volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 stores information, instructions, and/or software (e.g., one or more software applications) related to the operation of the device 400. In some implementations, the memory 430 includes one or more memories that are coupled to one or more processors (e.g., the processor 420), such as via the bus 410.

The input component 440 enables the device 400 to receive input, such as user input and/or sensed input. For example, the input component 440 may include a touch screen, a keyboard, a keypad, a mouse, a button, a microphone, a switch, a sensor, a global positioning system sensor, an accelerometer, a gyroscope, and/or an actuator. The output component 450 enables the device 400 to provide output, such as via a display, a speaker, and/or a light-emitting diode. The communication interface 460 enables the device 400 to communicate with other devices via a wired connection and/or a wireless connection. For example, the communication interface 460 may include a receiver, a transmitter, a transceiver, a modem, a network interface card, and/or an antenna.

The device 400 may perform one or more operations or processes described herein. For example, a non-transitory computer-readable medium (e.g., the memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
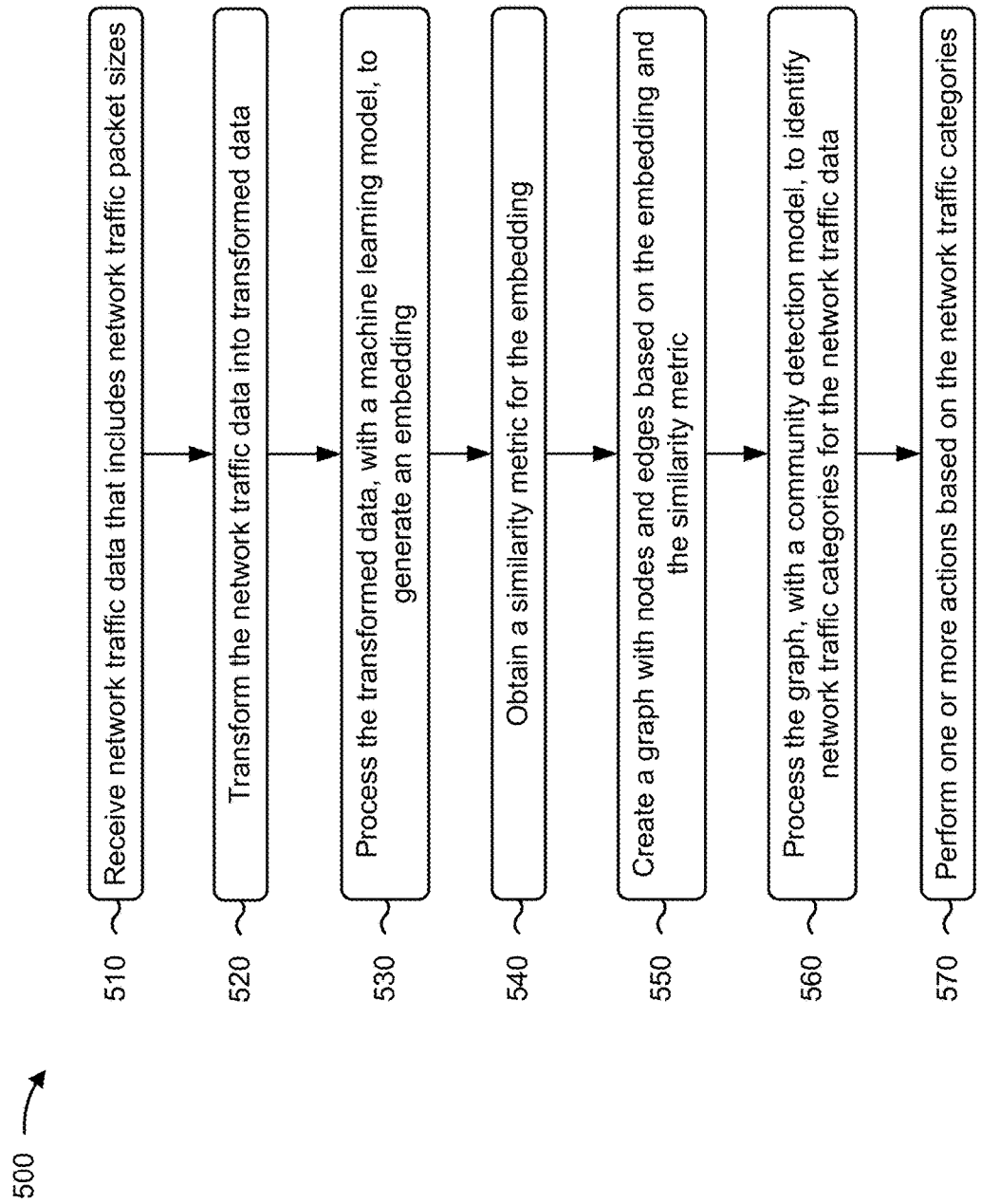
FIG. 5 is a flowchart of an example process for utilizing machine learning models for network traffic categorization.

FIG. 5 is a flowchart of an example process 500 for utilizing machine learning models for network traffic categorization. In some implementations, one or more process blocks of FIG. 5 may be performed by a device (e.g., the categorization system 301). In some implementations, one or more process blocks of FIG. 5 may be performed by another device or a group of devices separate from or including the device, such as a network device (e.g., the network device 330). Additionally, or alternatively, one or more process blocks of FIG. 5 may be performed by one or more components of the device 400, such as the processor 420, the memory 430, the input component 440, the output component 450, and/or the communication interface 460.

As shown in FIG. 5, process 500 may include receiving network traffic data that includes network traffic packet sizes (block 510). For example, the device may receive network traffic data that includes network traffic packet sizes, as described above.

As further shown in FIG. 5, process 500 may include transforming the network traffic data into transformed data (block 520). For example, the device may transform the network traffic data into transformed data, as described above. In some implementations, transforming the network traffic data into the transformed data includes transforming the network traffic packet sizes into images that correspond to the transformed data. In some implementations, transforming the network traffic data into the transformed data includes transforming the network traffic data into a format capable of being processed by the machine learning model.

As further shown in FIG. 5, process 500 may include processing the transformed data, with a machine learning model, to generate an embedding (block 530). For example, the device may process the transformed data, with a machine learning model, to generate an embedding, as described above. In some implementations, processing the transformed data, with the machine learning model, to generate the embedding includes processing the transformed data, with a two-dimensional convolutional model with max-pooling dropout, to generate the embedding. In some implementations, processing the transformed data, with the machine learning model, to generate the embedding includes processing the transformed data, with an autoencoder model, to generate the embedding. In some implementations, processing the transformed data, with the machine learning model, to generate the embedding includes processing the transformed data, with the machine learning model, to identify information for categorizing the network traffic data without prior knowledge of the network traffic categories.

As further shown in FIG. 5, process 500 may include obtaining a similarity metric for the embedding (block 540). For example, the device may obtain a similarity metric for the embedding, as described above. In some implementations, obtaining the similarity metric for the embedding includes obtaining a correlation coefficient as the similarity metric for the embedding.

As further shown in FIG. 5, process 500 may include creating a graph with nodes and edges based on the embedding and the similarity metric (block 550). For example, the device may create a graph with nodes and edges based on the embedding and the similarity metric, as described above. In some implementations, creating the graph with the nodes and the edges based on the embedding and the correlation coefficient includes converting the embedding into the nodes of the graph, and defining the edges between the nodes of the graph based on the correlation coefficient.

As further shown in FIG. 5, process 500 may include processing the graph, with a community detection model, to identify network traffic categories for the network traffic data (block 560). For example, the device may process the graph, with a community detection model, to identify network traffic categories for the network traffic data, as described above. In some implementations, processing the graph, with the community detection model, to identify the network traffic categories for the network traffic data includes processing the graph, with the community detection model, to determine a quantity of the network traffic categories for the network traffic data without prior selection of the quantity of the network traffic categories. In some implementations, processing the graph, with the community detection model, to identify the network traffic categories for the network traffic data includes processing the graph, with the community detection model, to determine a quantity of the network traffic categories automatically from the network traffic data.

As further shown in FIG. 5, process 500 may include performing one or more actions based on the network traffic categories (block 570). For example, the device may perform one or more actions based on the network traffic categories, as described above. In some implementations, performing the one or more actions includes one or more of providing the network traffic categories for display, or retraining one or more of the machine learning model or the community detection model based on the network traffic categories. In some implementations, performing the one or more actions includes one or more of determining and implementing a network traffic policy based on the network traffic categories, or determining and implementing a network traffic policy for each of the network traffic categories. In some implementations, performing the one or more actions includes determining policies for network devices based on the network traffic categories, and causing the policies to be implemented by the network devices.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, by a device, network traffic data that includes network traffic packet sizes;
   transforming, by the device, the network traffic data into transformed data;
   processing, by the device, the transformed data, with a machine learning model, to generate an embedding;
   obtaining, by the device, a similarity metric for the embedding;
   creating, by the device, a graph with nodes and edges based on the embedding and the similarity metric;
   processing, by the device, the graph, with a community detection model, to identify network traffic categories for the network traffic data,
      wherein processing the graph to identify the network traffic categories for the network traffic data comprises:
         processing the graph to determine a quantity of the network traffic categories automatically from the network traffic data and without prior selection of the quantity of the network traffic categories; and
   performing, by the device, one or more actions based on the network traffic categories.

2. The method of claim 1, wherein transforming the network traffic data into the transformed data comprises:
   transforming the network traffic data into a format capable of being processed by the machine learning model.

3. The method of claim 1, wherein processing the transformed data, with the machine learning model, to generate the embedding comprises:
   processing the transformed data, with a machine learning model as representation learning, to generate the embedding.

4. The method of claim 1, wherein processing the transformed data, with the machine learning model, to generate the embedding comprises:
   processing the transformed data, with the machine learning model, to identify information for categorizing the network traffic data without prior knowledge of the network traffic categories.

5. The method of claim 1, wherein obtaining the similarity metric for the embedding comprises:
   obtaining a correlation coefficient as the similarity metric for the embedding.

6. The method of claim 5, wherein creating the graph with the nodes and the edges based on the embedding and the correlation coefficient comprises:
   converting the embedding into the nodes of the graph; and
   defining the edges between the nodes of the graph based on the correlation coefficient.

7. The method of claim 1, wherein performing the one or more actions comprises:
   determining and implementing a network traffic policy for each of the network traffic categories.

8. A device, comprising:
   one or more memories; and
   one or more processors to:
      receive network traffic data that includes network traffic packet sizes;
      transform the network traffic data into transformed data;
      process the transformed data, with a machine learning model, to generate an embedding;
      determine a correlation coefficient for the embedding;
      create a graph with nodes and edges based on the embedding and the correlation coefficient;
      process the graph, with a community detection model, to identify network traffic categories for the network traffic data,
         wherein the one or more processors, to process the graph, with the community detection model, to identify the network traffic categories for the network traffic data, are to:
            process the graph to determine a quantity of the network traffic categories automatically from the network traffic data and without prior selection of the quantity of the network traffic categories; and perform one or more actions based on the network traffic categories.

9. The device of claim 8, wherein the one or more processors, to create the graph with the nodes and the edges based on the embedding and the correlation coefficient, are to:
convert the embedding into the nodes of the graph; and
define the edges between the nodes of the graph based on the correlation coefficient.

10. The device of claim 8, wherein the one or more processors, to process the graph, with the community detection model, to identify the network traffic categories for the network traffic data, are to:
process the graph, with the community detection model, to determine a quantity of the network traffic categories automatically from the network traffic data.

11. The device of claim 8, wherein the one or more processors, to perform the one or more actions, are to one or more of:
provide the network traffic categories for display; or
retrain one or more of the machine learning model or the community detection model based on the network traffic categories.

12. The device of claim 8, wherein the one or more processors, to perform the one or more actions, are to one or more of:
determine and implement a network traffic policy based on the network traffic categories; or
determine and implement a network traffic policy for each of the network traffic categories.

13. The device of claim 8, wherein the one or more processors, to perform the one or more actions, are to:
determine policies for network devices based on the network traffic categories; and
cause the policies to be implemented by the network devices.

14. The device of claim 8, wherein the one or more processors, to process the transformed data to generate the embedding, are to one or more of:
process the transformed data to identify information for categorizing the network traffic data without prior knowledge of the network traffic categories.

15. A non-transitory computer-readable medium storing a set of instructions, the set of instructions comprising:
one or more instructions that, when executed by one or more processors of a device, cause the device to:
receive network traffic data that includes network traffic packet sizes;
transform the network traffic data into transformed data;
process the transformed data, with a machine learning model, to generate embedding;
obtain a similarity metric correlation coefficient for the embedding;
convert the embedding into nodes of a graph;
define edges between the nodes of the graph based on the similarity metric correlation coefficient;
process the graph, with a community detection model, to identify a quantity of network traffic categories automatically for the network traffic data without prior selection of the quantity of the network traffic categories; and
perform one or more actions based on the network traffic categories.

16. The non-transitory computer-readable medium of claim 15, wherein the one or more instructions, that cause the device to transform the network traffic data into the transformed data, cause the device to:
transform the network traffic data into a format capable of being processed by the machine learning model.

17. The non-transitory computer-readable medium of claim 15, wherein the one or more instructions, that cause the device to process the transformed data, with the machine learning model, to generate the embedding, cause the device to:
process the transformed data, with a machine learning model as representation learning, to generate the embedding.

18. The non-transitory computer-readable medium of claim 15, wherein the one or more instructions, that cause the device to process the transformed data, with the machine learning model, to generate the embedding, cause the device to:
process the transformed data, with the machine learning model, to identify information for categorizing the network traffic data without prior knowledge of the network traffic categories.

19. The non-transitory computer-readable medium of claim 15, wherein the one or more instructions, that cause the device to perform the one or more actions, cause the device to one or more of:
provide the network traffic categories for display;
retrain one or more of the machine learning model or the community detection model based on the network traffic categories;
determine and implement a network traffic policy based on the network traffic categories;
determine and implement a network traffic policy for each of the network traffic categories; or
determine and implement policies for network devices based on the network traffic categories.

20. The non-transitory computer-readable medium of claim 15, wherein the one or more instructions, that cause the device to define edges between the nodes of the graph based on the similarity metric correlation coefficient, cause the device to one or more of:
convert the embedding into the nodes of the graph.

* * * * *